United States Patent
Pierini

(10) Patent No.: US 12,204,059 B2
(45) Date of Patent: Jan. 21, 2025

(54) SYSTEM AND METHOD FOR MONITORING AND DETECTING AN ILLEGAL SUMP PUMP IN A SEWER SYSTEM

(71) Applicant: Spencer Travis Pierini, Trenton, NJ (US)

(72) Inventor: Spencer Travis Pierini, Trenton, NJ (US)

( * ) Notice: Subject to any disclaimer, the term of this patent is extended or adjusted under 35 U.S.C. 154(b) by 359 days.

(21) Appl. No.: 17/889,336

(22) Filed: Aug. 16, 2022

(65) Prior Publication Data

US 2023/0046461 A1    Feb. 16, 2023

Related U.S. Application Data

(60) Provisional application No. 63/233,669, filed on Aug. 16, 2021.

(51) Int. Cl.
*G01V 1/00*     (2024.01)
*E03F 7/00*     (2006.01)

(52) U.S. Cl.
CPC .............. *G01V 1/001* (2013.01); *E03F 7/00* (2013.01)

(58) Field of Classification Search
CPC ... E03F 5/22; E03F 7/00; G01V 1/001; G06Q 50/10; G06Q 10/06393; E01F 5/005; G01F 23/185; G08C 17/02; G16Y 10/35; G16Y 40/10; G16Y 40/30; H04W 4/38; G08B 21/182; G08B 25/002; G08B 25/008; G08B 31/00; G08B 21/18; G08B 13/1472; G08B 13/1654; G08B 13/19602; G01D 21/02; G06N 3/126; G06N 3/08; G06N 7/01; G01H 9/004; G06V 10/28; G06V 10/449;
(Continued)

(56) References Cited

U.S. PATENT DOCUMENTS 4,911,012 A * 3/1990 Ziska ................... G01V 1/001
73/584
5,127,267 A * 7/1992 Huebler ............... G01V 1/001
73/40.5 A
(Continued)

FOREIGN PATENT DOCUMENTS

AU     2010214066 B2 * 12/2013  ............. G06Q 10/06
AU     2010214066 B8 *  1/2014  ............. G06Q 10/06
(Continued)

*Primary Examiner* — Daniel L Murphy
*Assistant Examiner* — Amie M Ndure

(57) ABSTRACT

A system and a method for monitoring and detecting an illegal sump pump in a sewer system is used to accurately detect and locate sump pumps that are illegally connected to the sewer system. Actual audio profiles are collected and timestamped with audio-recording devices. The actual audio profiles from the audio-recording devices are relayed to the remote server. The remote server compares each actual audio profile to a baseline audio profile to identify at least one matching audio profile. If the matching audio profile is identified amongst the actual audio profiles, the remote server geolocates a potential location for an illegal sump pump based on the sewer location of the corresponding audio-recording device for the matching audio profile. The remote server compiles the potential location of an illegal sump pump into a summarization report. The sewer system is continuously monitored by executing several iterations of the overall process.

8 Claims, 7 Drawing Sheets

(58) Field of Classification Search
CPC .................. Y02A 20/152; Y02A 20/20; G06T 2207/30181
USPC ........................................................ 367/139
See application file for complete search history.

(56) References Cited

U.S. PATENT DOCUMENTS

| | | | | |
|---|---|---|---|---|
| 2003/0033879 A1* | 2/2003 | Adewumi | .............. | G01N 29/40 |
| | | | | 73/627 |
| 2013/0085690 A1* | 4/2013 | Fei | ............................ | F17D 5/06 |
| | | | | 702/51 |
| 2014/0368378 A1* | 12/2014 | Crain | ..................... | H01Q 21/28 |
| | | | | 342/25 A |

FOREIGN PATENT DOCUMENTS

| | | | | |
|---|---|---|---|---|
| CA | 2754418 C | 5/2014 | | |
| CN | 202040552 U | 11/2011 | | |
| WO | WO-2011134881 A1 * | 11/2011 | ............. | E21B 47/10 |

* cited by examiner (A) Providing a plurality of audio-recording devices and at least one remote server, wherein the audio-recording devices are distributed throughout a sewer system, and wherein the remote server manages at least one baseline audio profile, and wherein the baseline audio profile is an audible characterization of an illegal sump pump, and wherein the remote server stores a sewer location for each audio-recording device

(B) Collecting and timestamping a plurality of actual audio profiles with the audio-recording devices, wherein each actual audio profile is associated with a corresponding audio-recording device from the plurality of audio-recording devices

(C) Relaying the actual audio profiles from the audio-recording devices to the remote server

(D) Comparing each actual audio profile to the baseline audio profile with the remote server in order to identify at least one matching audio profile amongst the plurality of actual audio profiles, wherein the matching audio profile audibly resembles the baseline audio profile

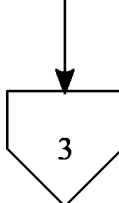

FIG. 2

SYSTEM AND METHOD FOR MONITORING AND DETECTING AN ILLEGAL SUMP PUMP IN A SEWER SYSTEM

The current application claims a priority to the U.S. provisional patent application Ser. No. 63/233,669 filed on Aug. 16, 2021.

FIELD OF THE INVENTION

The present invention generally relates to systems and methods for locating basement sump pumps which are illegally connected to a public sewer system. More specifically, the present invention provides a system and a method that monitors a sewer system to detect and locate potential illegal sump pumps based on audio data collected from the sewer system.

BACKGROUND OF THE INVENTION

Nowadays, sump pumps are integral features of most residential buildings. A sump pump is typically found at the lowest point within a residential building to remove water that has accumulated in a water-collecting sump basin. For example, the sump pump and the corresponding equipment can be found in the basement of a residential household to collect and remove leaked water from the basement. The water may also enter the basement via the perimeter drains of a basement waterproofing system, funneling into the basin, heavy rain, or natural ground water. This way, the sump pump prevents water damage to the residential building as well as other water-related issues. Further, sump pumps in residential buildings are often connected to a public sewer system which results in increased expenses to the sewer utility companies which are traditionally passed along to the building owners as service fees.

However, to avoid damage to the property, the building owners may choose to connect the sump pump to the public sewer system without notifying the sewer utility company. These illegal sump pumps connected to the public sewer system are inputting what is essentially clean water that should be routed to stormwater systems, rather than the sewer system. Thus, sewer utility companies are utilizing additional and unnecessary power and chemicals to treat clean water. In addition, additional water flow can increase the wear and tear on the wastewater treatment process equipment. Currently, there are different methods for detecting and locating the illegal pump sumps that have been implemented in sewer systems. However, these methods are often inefficient and do not provide the information necessary to accurately locate the illegal pump sumps without additional equipment and labor.

Therefore, an objective of the present invention is to provide a system and a method for monitoring and detecting illegal sump pumps by monitoring the sounds within the sewer system. The present invention monitors the sounds travelling through the sewer system which are analyzed to detect illegal sump pumps. Another objective of the present invention is to provide a system and a method for monitoring and detecting illegal sump pumps by utilizing machine learning to automatically detect sump pump sound signatures. The present invention utilizes machine learning to automatically detect sump pump sound signatures from the audio recordings of the sewer system. Another objective of the present invention is to provide a system and a method for monitoring and detecting illegal sump pumps that provides the accurate location of the illegal sump pumps using the detected sump pump sound signatures. The present invention utilizes different methods to calculate the geolocation of the illegal sump pumps using the audio data associated with the sump pump sound signatures. Another objective of the present invention is to provide a system and a method for monitoring and detecting illegal sump pumps that provides the information necessary to authorized users for locating the illegal sump pumps. The present invention can generate formal reports that include the necessary information regarding the illegal sump pumps. Additional benefits and features of the present invention are further discussed in the sections below.

SUMMARY OF THE INVENTION

The present invention is a system and a method for monitoring and detecting an illegal sump pump in a sewer system. The present invention enables users such as, but not limited to, a sewer utility company to detect sump pumps that may be illegally connected to the sewer system in order to prevent unnecessary operational costs and wear and tear on the sewer system. In the preferred embodiment, the present invention collects audio data within gravity sewers to locate sump pumps that are illegally connected to the public sewer system. The captured audio data can then be transmitted to a central server for analysis or can be stored locally until the audio data can be uploaded to the central server. The audio data can be transmitted using different communication protocols including, but not limited to, cellular, Wi-Fi, or Radio Frequency (RF) based protocols.

Once all the audio data is compiled in the central server, the audio data is analyzed using machine learning that quickly identifies sound patterns between various manholes (nodes). The time stamps associated with identified sump patterns are then routed to a geolocation algorithm that analyzes the network data until a determinate manhole (root node) is identified. The distance from the root node is then determined using different methodologies to accurately determine the location of the illegal sump pump in the sewer system. The final step is to generate a formal report that contains the calculation results that can be shared with the necessary people.

DETAIL DRAWINGS OF THE INVENTION

FIG. 2 is a flowchart illustrating an overall process for the method of the present invention.

DETAIL DESCRIPTIONS OF THE INVENTION

All illustrations of the drawings are for the purpose of describing selected versions of the present invention and are not intended to limit the scope of the present invention.

Figure 1:
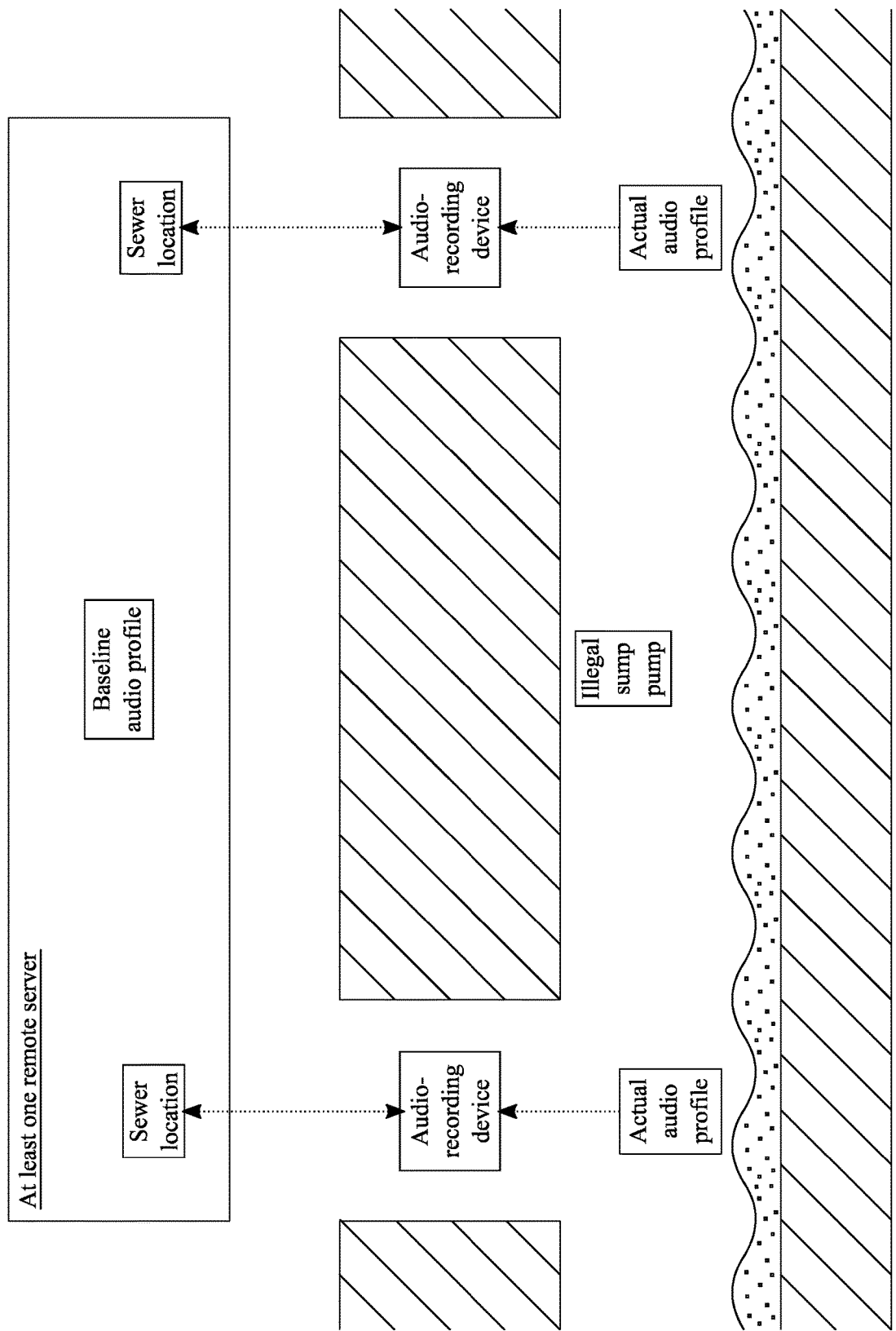
FIG. 1 is a block diagram showing the system of the present invention.

The present invention is a system and a method for monitoring and detecting an illegal sump pump in a sewer system. The present invention enables the accurate detection and location of sump pumps that are illegally connected to a sewer system by analyzing audio data from the sewer system. As can be seen in FIG. 1, the system of the present invention includes a plurality of audio-recording devices and at least one remote server. The audio-recording devices are distributed throughout a sewer system to enable the recording of sound data from within the sewer system. The audio-recording devices can be distributed throughout the sewer system in different patterns, such as positioning the audio-recording devices at key locations within the sewer system. The remote server acts as a central database where the audio data is compiled for further analysis. Further, the remote server manages at least one baseline audio profile, wherein the baseline audio profile is an audible characterization of an illegal sump pump. The baseline audio profile is used by the remote server to automatically detect illegal sumps and is constantly updated by utilizing machine learning to refine the audible characterization of an illegal sump pump. Further, the remote server stores a sewer location for each audio-recording device, which allows present invention to determine the location of the illegal sump pump once the audio data from the audio-recording devices is analyzed by the remote server.

Figure 3:
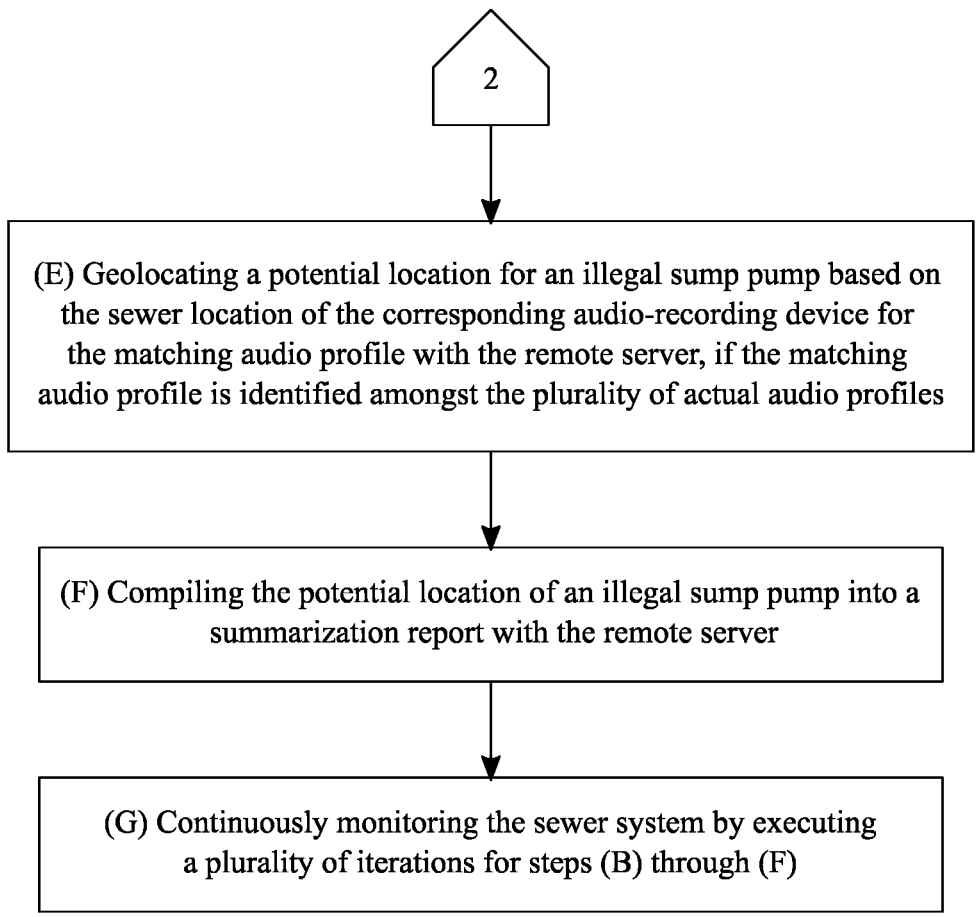
FIG. 3 is a continuation of the flowchart in FIG. 2.

By utilizing the audio-recording devices, the remote server is able to compile enough audio data to detect illegal sump dumps and to determine the potential geolocation of the illegal sump dumps. As can be seen in FIGS. 2 and 3, an overall process of the method of the present invention begins by collecting and timestamping a plurality of actual audio profiles with the audio-recording devices (Step B). Each actual audio profile is associated with a corresponding audio-recording device from the plurality of audio-recording devices. In other words, the actual audio profile includes the audio data collected in real-time from the area within the sewer system in which the audio-recording device was installed. The actual audio profile is also timestamped and designated with source data that helps identify which audio-recording device is associated with each actual audio profile was recorded. Then, the actual audio profiles from the audio-recording devices are relayed to the remote server for processing and analysis (Step C). The actual audio profiles can be relayed in different ways depending on the location of the audio-recording devices. Once the remote server receives the actual audio profiles, the remote server compares each actual audio profile to the baseline audio profile in order to identify at least one matching audio profile amongst the plurality of actual audio profiles (Step D). In other words, the remote server searches for a matching audio profile that audibly resembles the baseline audio profile. If the matching audio profile is identified amongst the plurality of actual audio profiles, the remote server geolocates a potential location for an illegal sump pump based on the sewer location of the corresponding audio-recording device for the matching audio profile (Step E). After the geolocation of the potential location for an illegal sump pump has been determined, the remote server compiles the potential location of an illegal sump pump into a summarization report (Step F). The summarization report is an official report that is shared with authorized users such as, but not limited to, staff from the sewer utility company so that the authorized users can perform any necessary actions. Furthermore, the sewer system is continuously monitored by executing a plurality of iterations for Steps B through F so that any illegal sump pumps in the sewer system are promptly detected and located.

The present invention can facilitate the accurate detection and location of illegal sump pumps by appropriately covering the reach of the sewer system. Distributing audio-recording devices throughout the sewer system at short intervals can be unpractical due to the large size of the sewer system. So, the audio-recording devices are positioned at key locations throughout the sewer system. For example, the sewer system can include a plurality of manholes that facilitate the access of staff into the sewer system at important locations throughout the sewer system. Further, each audio-recording device can be mounted within or adjacent to a corresponding manhole from the plurality of manholes. This way, the audio-recording devices are accessible for maintenance while also positioning the audio-recording devices at key locations for the accurate detection and location of illegal sump pumps. In other embodiments, the audio-recording devices can be mounted within the sewer system at other locations throughout the sewer system, such as in the sewer tunnels between manholes.

Figure 4:
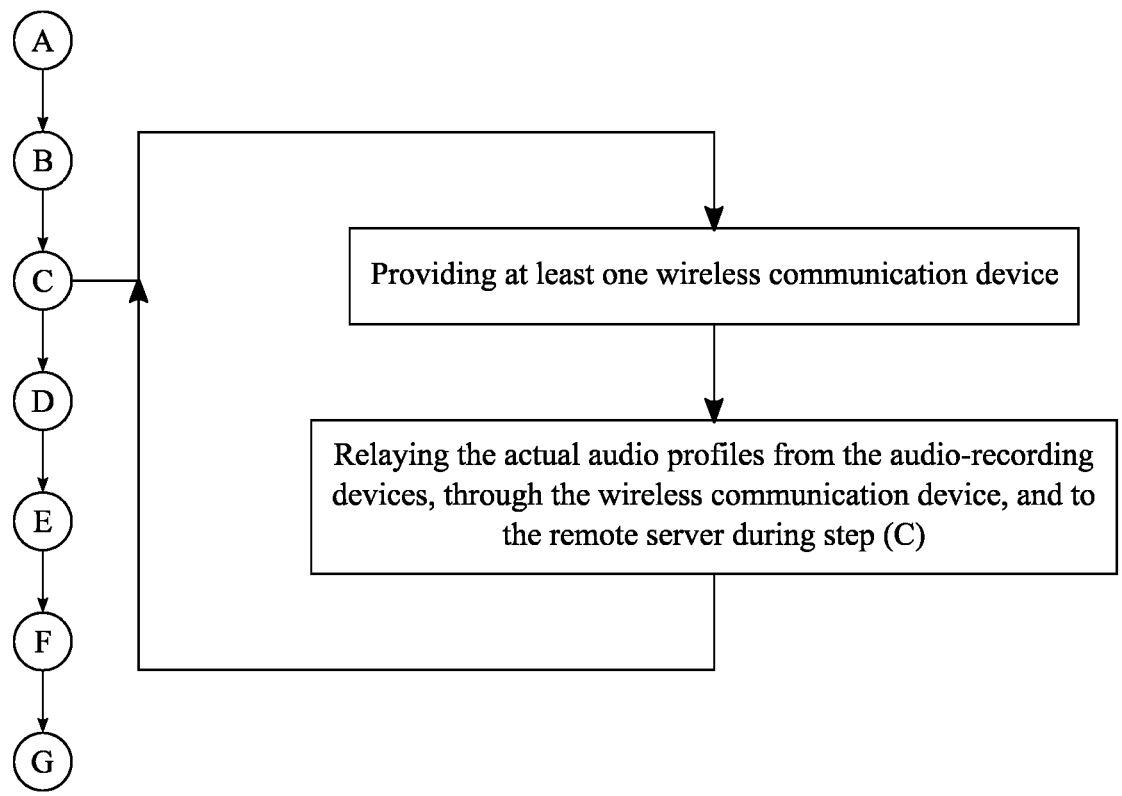
FIG. 4 is a flowchart illustrating the subprocess of wireless audio data transmission of the present invention.

As previously discussed, the recorded audio data can be relayed from the audio-recording devices to the remote servers via different communication methods. In one embodiment, the recorded audio data can be wirelessly transmitted to the remote server via different wireless protocols including, but not limited to, cellular data, long-distance wireless protocols such as Wi-Fi, short-distance wireless protocols, or Radio Frequency (RF) based protocols. To do so, the system of the present invention can further include at least one wireless communication device that enables the wireless transmission of the recorded audio data. As can be seen in FIG. 4, the subprocess of wireless audio data transmission includes the step of relaying the actual audio profiles from the audio-recording devices, through the wireless communication device, and to the remote server during Step C. The actual audio profiles can be wirelessly transmitted in a continuous manner or at predetermined intervals so that any illegal sump pumps can be promptly detected and located by the present invention. Furthermore, the at least one wireless communication device can be a plurality of wireless communication devices to cover the large area of the sewer system. The wireless communication devices can be distributed throughout the sewer system in such a way that a group of audio-recording devices is connected to a corresponding wireless communication device. This creates a safety net that covers the sewer system where if a wireless communication device fails, only the corresponding audio-recording devices are disconnected from the remote server.

Figure 5:
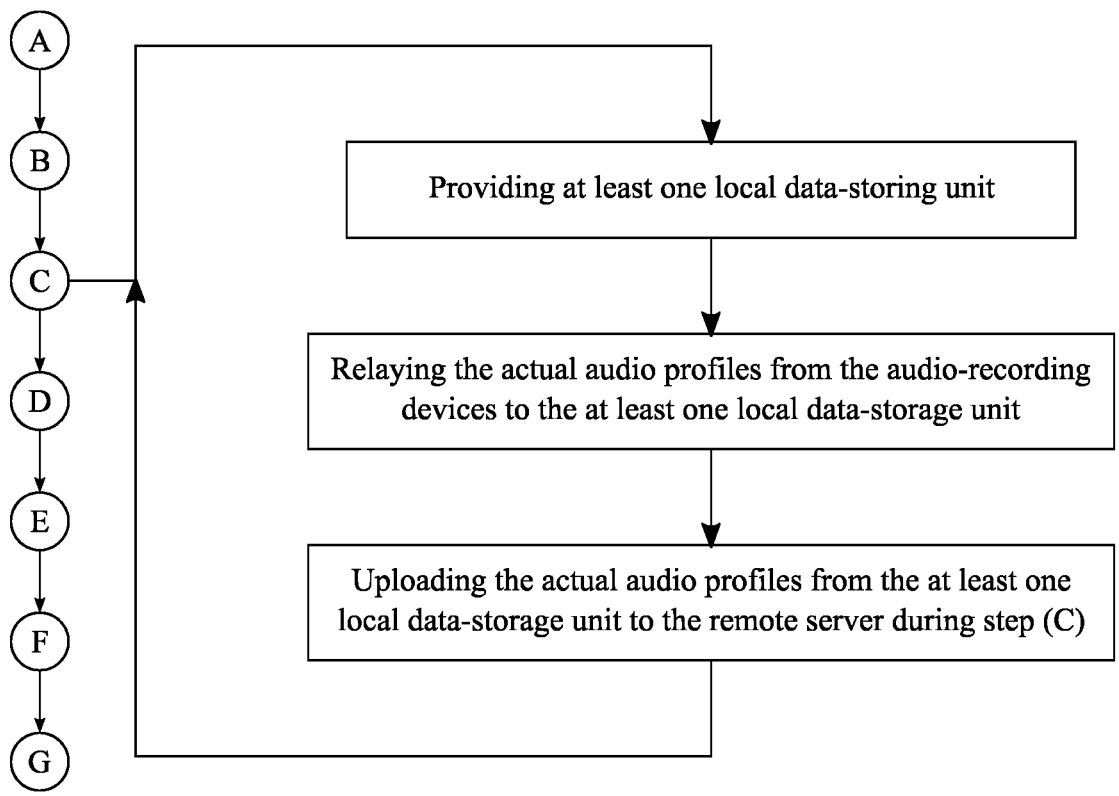
FIG. 5 is a flowchart illustrating the subprocess of local audio data storage of the present invention.

In another embodiment, the location of the audio-recording devices may prevent the use of wireless communication between the audio-recording devices and the remote server. So, the present invention may include means to locally store the recorded audio data until the audio data can be uploaded to the remote server. To do so, the system of the present invention can further include at least one local data-storing unit that securely stores the recorded audio data. As can be seen in FIG. 5, the subprocess of local audio data storage includes the steps of relaying the actual audio profiles from the audio-recording devices to the at least one local data-storage unit. For example, the audio-recording devices can be hardwired to the local data-storage unit so that the actual audio profiles can be transmitted to the local data-storage unit. Then, the actual audio profiles are uploaded from the at least one local data-storage unit to the remote server during Step C. The upload can be performed various ways. For example, staff can periodically collect the actual audio profiles from the local data-storage unit and then upload the actual audio profiles to the remote server. Furthermore, similar to the wireless communication device, the at least one local data-storage unit can be a plurality of local data-storage units to cover the large area of the sewer system. The local data-storage units can be distributed throughout the sewer system in such a way that a group of audio-recording devices is connected to a corresponding local data-storage unit. This creates a safety net that covers the sewer system where if a local data-storage unit fails, only the actual audio profiles from the corresponding audio-recording devices are not saved. In other embodiments, both the wireless communication device and the local data-storage unit can be provided together as a hub that continuously records the actual audio profiles and periodically relays the compiled actual audio profiles to the remote server.

As previously discussed, once the actual audio profiles are collected and relayed to the remote server, the actual audio profiles are processed and compiled to be analyzed in order to detect potential illegal sump pumps and to determine the location of the potential illegal sump pumps. The remote server is equipped with one or more machine learning algorithms (MLAs) that help detect the potential illegal sump pumps using the actual audio profiles. During Step D, the MLAs compare the actual audio profiles with the baseline audio profile in order to find an audio profile that matches the audible characterization of an illegal sump pump. In the initial stages, the MLAs can be trained utilizing existing recordings of illegal sump pumps in order to generate an audible characterization that can be used for the baseline audio profile. The baseline audio profile helps eliminate noise, typical sewer noises, as well as random noises that could be wrongly detected as illegal sump pumps. Further, in every iteration after Step G, the baseline audio profile is improved to more accurately resemble the audible characterization of an illegal sump pump within that specific sewer system. That way, the present invention can overtime accurately detect illegal sump pumps in the sewer system by using the actual recordings from the sewer system.

Once an illegal sump pump has been detected by the remote server using the MLAs, the present invention proceeds to determine the location of the illegal sump pump in the sewer system utilizing different geolocation methods. During Step E, the remote server narrows down the location of the illegal sump pump in the sewer system by analyzing the dissipation of the sounds made by the illegal sump pump. For example, as the sound travels far from the illegal sump pump (the source), the intensity of the sound attenuates. This helps the remote server to determine the overall location of the source by first determining the audio-recording device or audio-recording devices (the nodes) that are the closest to the source. In some embodiments, the remote server can utilize the plurality of manholes where the audio-recording devices are mounted within or adjacent to as nodes. Further, the remote server eliminates nodes by tracking the attenuation of the sound until the nodes that are the nearest to the source are determined. Then, the closest node is designated as the root node while the second closest node is designated as the adjacent root node. The pair of the root node and the adjacent root node thus includes the nodes with the actual audio profiles with the strongest intensity and amplitude. The pair of nodes can be used to provide an overall location of the illegal sump pump. However, a more accurate geolocation can be determined by the present invention.

Figure 6:
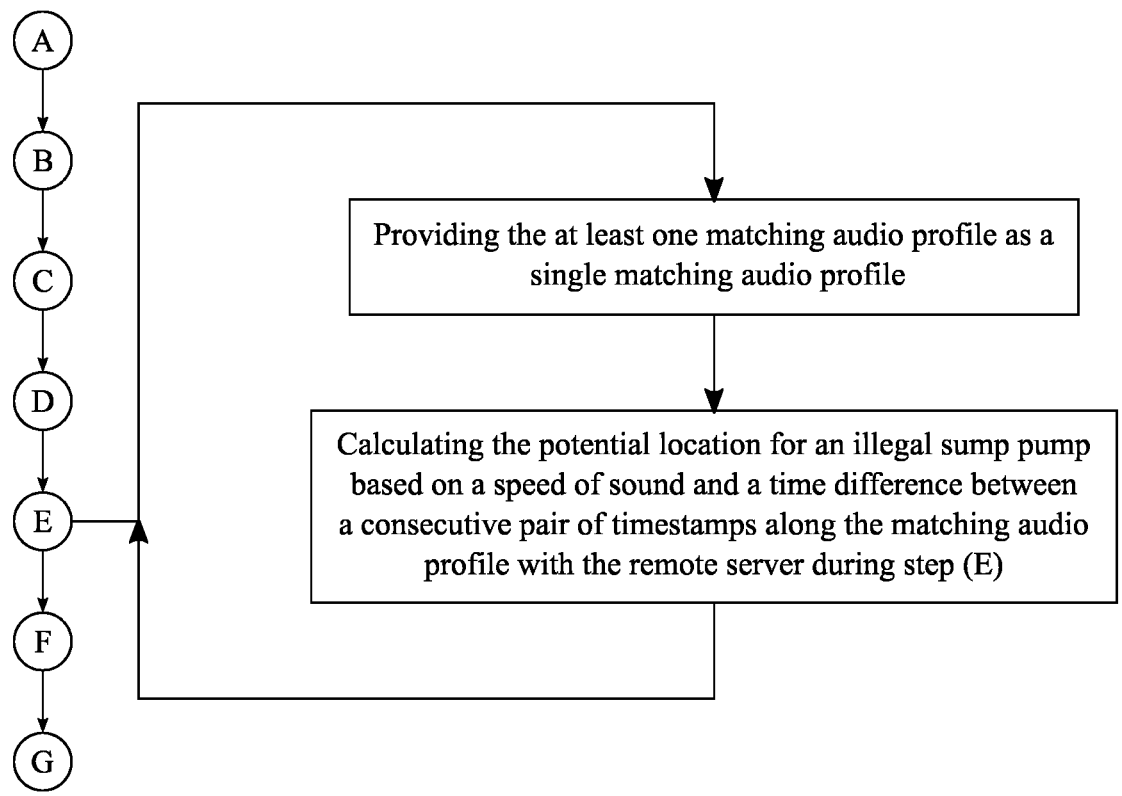
FIG. 6 is a flowchart illustrating the subprocess of calculating the distance of the illegal sump pump from the root node of the present invention.

The present invention utilizes standard sound wave laws to calculate a more accurate location of the illegal sump pump in relation to the location of the nodes (i.e., the sound-recording devices or the manholes). During Step E, the present invention can utilize different methods to calculate the distance of the source to the root node and/or the adjacent root node. In one embodiment, the at least one matching audio profile is provided as a single matching audio profile preferably corresponding to the audio profile recorded by the root node. As can be seen in FIG. 6, the subprocess of calculating the distance of the illegal sump pump from the root node involves calculating the potential location for an illegal sump pump based on a speed of sound and a time difference between a consecutive pair of timestamps along the matching audio profile with the remote server during Step E. The present invention determines the distance of the source from the root node utilizing the speed of sound wave equation:

$$D = \Delta t * S$$

Wherein D corresponds to the distance from the source, $\Delta t$ corresponds to the time differential between the timestamps between the nodes, and S corresponds to the speed of sound in feet per second. The equation outputs a positive value or a negative value according to the time differential which can be used to determine the direction of the source relative to the root node.

Figure 7:
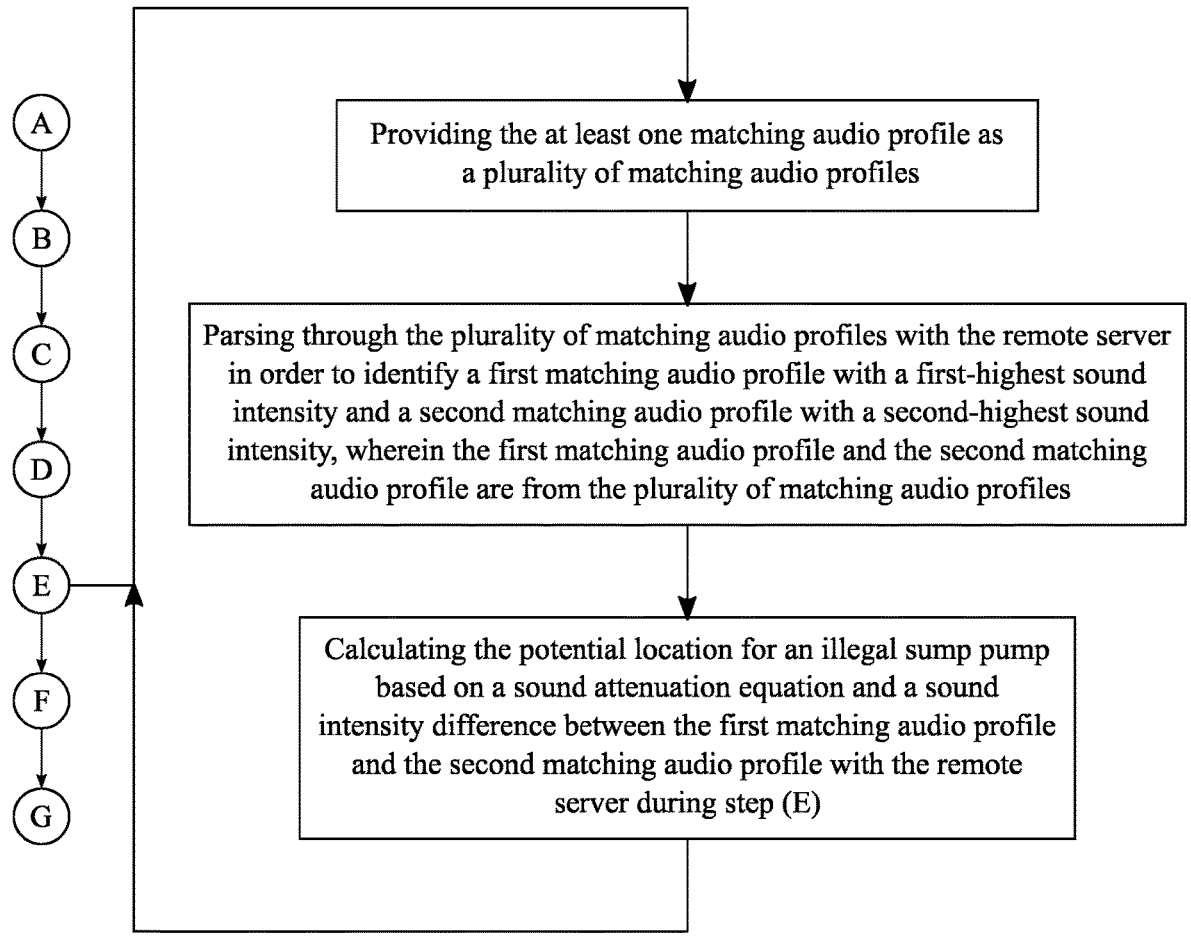
FIG. 7 is a flowchart illustrating the subprocess of calculating the distance of the illegal sump pump from the root node and the adjacent root node of the present invention.

In another embodiment, the present invention can provide a more accurate location in between the root node and the adjacent root node by utilizing the sound pressures recorded at the root node and the adjacent root node. In this embodiment, the at least one matching audio profile is provided as a plurality of matching audio profiles corresponding to the audio profiles recorded at the root node and the adjacent root node. As can be seen in FIG. 7, the subprocess of calculating the distance of the illegal sump pump from the root node and the adjacent root node includes the steps of parsing through the plurality of matching audio profiles with the remote server in order to identify a first matching audio profile with a first-highest sound intensity and a second matching audio profile with a second-highest sound intensity. The first matching audio profile and the second matching audio profile are from the plurality of matching audio profiles and correspond to the audio profiles recorded at the root node and the adjacent root node. Then, the potential location for an illegal sump pump is calculated based on a sound attenuation equation and a sound intensity difference between the first matching audio profile and the second matching audio profile with the remote server during Step E. The calculation of the distance of the source between the root node and the adjacent root node using the sound pressures preferably utilizes the following equation:

$$L_2 = L_1 - \left| 20 * \log\left(\frac{r_1}{r_2}\right) \right|$$

Wherein $L_2$ corresponds to the sound pressure at the adjacent root node, $L_1$ corresponds to the sound pressure at the root node, $r_2$ corresponds to the distance between the adjacent root node and the source, and $r_1$ corresponds to the distance between the root node and the source. The calculation of the distance of the source between the root node and the adjacent root node using the sound intensities preferably utilizes the following equation:

$$L_2 = L_1 - 10 * \log\left(\frac{r_1}{r_2}\right)^2$$

Wherein $L_2$ corresponds to the sound pressure at the adjacent root node, $L_1$ corresponds to the sound pressure at the root node, $r_2$ corresponds to the distance between the adjacent root node and the source, and $r_1$ corresponds to the distance between the root node and the source. With these two equations, the distance between the source and the root node and the distance between the source and the adjacent root node can be determined using the process of substitution. Thus, an accurate location of the source between the root node and the adjacent root node can be determined. The calculated location of the illegal sump pump as well as other data regarding the location of the illegal sump pump is appended into the summarization report during Step F. The summarization report can be automatically generated by the remote server and shared with the authorized users such as, but not limited to, staff from the sewer utility company.

Although the invention has been explained in relation to its preferred embodiment, it is to be understood that many other possible modifications and variations can be made without departing from the spirit and scope of the invention.

What is claimed is:

1. A method for monitoring and detecting an illegal sump pump in a sewer system, the method comprising the steps of:
   (A) providing a plurality of audio-recording devices and at least one remote server, wherein the audio-recording devices are distributed throughout a sewer system, and wherein the remote server manages at least one baseline audio profile, and wherein the baseline audio profile is an audible characterization of an illegal sump pump, and wherein the remote server stores a sewer location for each audio-recording device;
   (B) collecting and timestamping a plurality of actual audio profiles with the audio-recording devices, wherein each actual audio profile is associated with a corresponding audio-recording device from the plurality of audio-recording devices;
   (C) relaying the actual audio profiles from the audio-recording devices to the remote server;
   (D) comparing each actual audio profile to the baseline audio profile with the remote server in order to identify at least one matching audio profile amongst the plurality of actual audio profiles, wherein the matching audio profile audibly resembles the baseline audio profile;
   (E) geolocating a potential location for an illegal sump pump based on the sewer location of the corresponding audio-recording device for the matching audio profile with the remote server, if the matching audio profile is identified amongst the plurality of actual audio profiles;
   (F) compiling the potential location of an illegal sump pump into a summarization report with the remote server; and
   (G) continuously monitoring the sewer system by executing a plurality of iterations for steps (B) through (F).

2. The method as claimed in claim 1, wherein the sewer system includes a plurality of manholes, and wherein each audio-recording device is mounted within or adjacent to a corresponding manhole from the plurality of manholes.

3. The method as claimed in claim 1 comprising the steps of:
   providing at least one wireless communication device; and
   relaying the actual audio profiles from the audio-recording devices, through the wireless communication device, and to the remote server during step (C).

4. The method as claimed in claim 3, wherein at least one wireless communication device is a plurality of wireless communication devices, and wherein the wireless communication devices are distributed throughout the sewer system.

5. The method as claimed in claim 1 comprising the steps of:
   providing at least one local data-storing unit;
   relaying the actual audio profiles from the audio-recording devices to the at least one local data-storage unit; and
   uploading the actual audio profiles from the at least one local data-storage unit to the remote server during step (C).

6. The method as claimed in claim 5, wherein at least one local data-storing unit is a plurality of local data-storing units, and wherein the local data-storing units are distributed throughout the sewer system.

7. The method as claimed in claim 1 comprising the steps of:
   providing the at least one matching audio profile as a single matching audio profile; and
   calculating the potential location for an illegal sump pump based on a speed of sound and a time difference between a consecutive pair of timestamps along the matching audio profile with the remote server during step (E).

8. The method as claimed in claim 1 comprising the steps of:
   providing the at least one matching audio profile as a plurality of matching audio profiles;
   parsing through the plurality of matching audio profiles with the remote server in order to identify a first matching audio profile with a first-highest sound intensity and a second matching audio profile with a second-highest sound intensity, wherein the first matching audio profile and the second matching audio profile are from the plurality of matching audio profiles; and
   calculating the potential location for an illegal sump pump based on a sound attenuation equation and a sound intensity difference between the first matching audio profile and the second matching audio profile with the remote server during step (E).

* * * * *